United States Patent
Ullah et al.

(10) Patent No.: US 12,418,528 B2
(45) Date of Patent: Sep. 16, 2025

(54) ESTABLISHMENT OF SECURE COMMUNICATION

(71) Applicant: Telefonaktiebolaget LM Ericsson (publ), Stockholm (SE)

(72) Inventors: Kazi Wali Ullah, Espoo (FI); Ari Pietikäinen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 193 days.

(21) Appl. No.: 18/020,549

(22) PCT Filed: Aug. 12, 2020

(86) PCT No.: PCT/EP2020/072639
§ 371 (c)(1),
(2) Date: Feb. 9, 2023

(87) PCT Pub. No.: WO2022/033676
PCT Pub. Date: Feb. 17, 2022

(65) Prior Publication Data
US 2023/0308440 A1    Sep. 28, 2023

(51) Int. Cl.
*H04L 29/00* (2006.01)
*H04L 9/40* (2022.01)

(52) U.S. Cl.
CPC ...... *H04L 63/0876* (2013.01); *H04L 63/0428* (2013.01); *H04L 63/102* (2013.01); *H04L 63/108* (2013.01); *H04L 63/1425* (2013.01); *H04L 63/20* (2013.01)

(58) Field of Classification Search
CPC ............. H04L 63/0876; H04L 63/0428; H04L 63/102; H04L 63/108; H04L 63/1425; H04L 63/20; H04L 63/0892; H04L 63/0823; H04L 67/141

See application file for complete search history.

(56) References Cited

U.S. PATENT DOCUMENTS

| | | | | |
|---|---|---|---|---|
| 9,876,823 B2* | 1/2018 | Smith | ...................... | H04L 9/088 |
| 9,989,043 B2* | 6/2018 | Lee | ........................ | G06F 21/72 |
| 10,299,128 B1* | 5/2019 | Suthar | ................... | H04L 9/3297 |
| 10,939,308 B2* | 3/2021 | Suthar | ................... | H04W 24/02 |
| 11,206,715 B2* | 12/2021 | Pocha | ...................... | H04L 45/68 |
| 11,356,453 B1* | 6/2022 | Victor | ................... | H04L 63/102 |

(Continued)

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.2.0, Jun. 2018, 217 pages.

(Continued)

*Primary Examiner* — Don G Zhao
(74) *Attorney, Agent, or Firm* — Weisberg I.P. Law, P.A.

(57) ABSTRACT

Methods and apparatus for establishing enhanced secure communication between two Network Entities. A method performed by a first Network Entity (NE1) to establish communication between the NE1 and a second Network Entity (NE2), wherein both NE1 and NE2 trust a Trusted Network Entity (TNE). The method comprises establishing an initial connection with the NE2, obtaining a report associated with NE1 from TNE, wherein the report is signed by the TNE and providing the report associated with NE1 to NE2.

13 Claims, 6 Drawing Sheets

(56) References Cited

U.S. PATENT DOCUMENTS

| | | | |
|---|---|---|---|
| 11,381,584 B1* | 7/2022 | Victor | G06F 9/45558 |
| 2005/0138384 A1* | 6/2005 | Brickell | G06F 21/57 |
| | | | 713/182 |
| 2015/0113618 A1 | 4/2015 | Sinha et al. | |
| 2017/0078922 A1* | 3/2017 | Raleigh | H04L 69/18 |
| 2019/0065406 A1* | 2/2019 | Steiner | H04L 9/3271 |
| 2019/0068608 A1* | 2/2019 | Boland | H04L 63/123 |
| 2019/0311123 A1* | 10/2019 | Lal | H04L 9/0631 |
| 2020/0045519 A1* | 2/2020 | Raleigh | H04W 4/08 |
| 2020/0128022 A1* | 4/2020 | Bleikertz | H04L 63/0421 |
| 2020/0145419 A1* | 5/2020 | Yitbarek | H04L 63/0853 |
| 2020/0167476 A1* | 5/2020 | Boulton | G06F 21/563 |
| 2020/0311281 A1* | 10/2020 | Boulton | G06F 21/552 |
| 2021/0081545 A1* | 3/2021 | Mulligan | G06F 9/45558 |
| 2021/0334797 A1* | 10/2021 | Tripathy | G06Q 20/3829 |
| 2022/0014512 A1* | 1/2022 | Raleigh | H04L 63/20 |
| 2022/0286474 A1* | 9/2022 | Kuppa | H04L 63/145 |

OTHER PUBLICATIONS

Knauth, Thomas, et al., "Integrating Intel SGX Remote Attestation with Transport Layer Security", arXiv:1801.05863, Computer Science > Cryptography and Security, Version 1.0, Jan. 17, 2018, 1-11.

* cited by examiner

ESTABLISHMENT OF SECURE COMMUNICATION

TECHNICAL FIELD

The present description generally relates to a communication network, and more particularly relates to the establishment of secure communications in a communication network.

BACKGROUND

Currently, Public Key Infrastructure (PKI) is commonly used for establishing trust relationship between two network entities. If the one network entity (NE) trusts the certificate provided by the other NE, then a trust relationship is established. Typically, in a client-server communication scenario, a client will initiate the communication where the server will reply to the communication request. In this scenario, usually, the server has to send its certificate to the client where the client verifies the server certificate against some pre-installed root certificate(s). The client should also check for certificate revocations in order to properly verify a certificate. Once all the checks are passed, then it is assumed that the server is legitimate, and the client can proceed with the communication. In some cases, where mutual authentication is required, the server asks for a client certificate and once it receives the client certificate, it verifies the certificate in similar way and proceeds with the communication once it gets verified.

Today, devices from all sorts of domains are getting connected to the internet. Study shows that the number of connected devices will be in the tens of billions in the coming years. With this vast number of devices, security and trust relationship between devices will become increasingly important.

However, the trust relationship established based solely on PKI and certificates of NEs may not be enough. There is no other way to evaluate whether the NEs should actually own these certificates. For example, one of the NE may be an imposter. Or, even if the certificate is owned by a legitimate NE, the NE itself may be poorly managed in terms of security (e.g. it has known security vulnerabilities). Thus, the other NE may not want to establish a communication with it because of that reason.

SUMMARY

Some embodiments herein may advantageously solve or at least mitigate one or more of the problems discussed above.

More particularly, some embodiments include a method performed by a first network entity (NE1) to establish communication between the NE1 and a second Network Entity (NE2), wherein both NE and NE2 trust a Trusted Network Entity (TNE). The method may comprise establishing an initial connection with the NE2. The method may further comprise obtaining a report associated with NE1 from TNE, wherein the report is signed by the TNE. The method may further comprise providing the report associated with NE1 to NE2. In some embodiments, the report associated with NE1 comprises an identity of NE1, a signature and trust evaluation information associated with NE1, wherein the signature comprises a timestamp. In some embodiments, the report may comprise a set of TEI associated with NE1 that helps to establish the trust relationship between NE1 and NE2. In some embodiments, the report may comprise a set of TEI associated with NE1 that helps NE2 to evaluate whether it is trustworthy to continue communication with NE1. In some embodiments, the report may particularly comprise one or more secure boot information of NE1, measured boot information of NE1, remote attestation information of NE1, highest Common Vulnerabilities and Exposer (CVE) score of NE1, a trust index of NE1, and a risk index of NE1.

Embodiments also include a first network entity (NE1) to establish communication between the NE1 and a second Network Entity (NE2), wherein both NE1 and NE2 trust a Trusted Network Entity (TNE). The NE1 comprises processing circuitry and memory, the memory contains instructions executable by the processing circuitry whereby the NE1 is configured to establish an initial connection with the NE2. The NE1 may further be configured to obtain a report associated with NE1 from TNE, wherein the report is signed by the TNE. The NE1 may further be configured to provide the report associated with NE1 to NE2. In some embodiments, the report associated with NE1 comprises an identity of NE1, a signature and trust evaluation information associated with NE1, wherein the signature comprises a timestamp. In some embodiments, the report may comprise a set of TEI associated with NE1 that helps to establish the trust relationship between NE1 and NE2. In some embodiments, the report may comprise a set of TEI associated with NE1 that helps NE2 to evaluate whether it is trustworthy to continue communication with NE1. In some embodiments, the report may particularly comprise one or more secure boot information of NE1, measured boot information of NE1, remote attestation information of NE1, highest Common Vulnerabilities and Exposer (CVE) score of NE1, a trust index of NE1, and a risk index of NE1.

Some embodiments include a computer program product. The computer program product comprises computer-readable instructions stored in a non-transitory computer-readable storage medium of the computer program product. When the instructions are executed by processing circuitry (e.g., at least one processor) of the first network entity (NE1), they enable the NE1 to perform one or more of the described NE1 functionalities.

Some embodiments include a method performed by a second Network Entity (NE2) (to establish communication between a first Network Entity (NE1) and the NE2, wherein both NE1 and NE2 trust a Trusted Network Entity (TNE). The method may comprise establishing an initial connection with the NE1. The method may further comprise obtaining a report associated with NE1, wherein the report is signed by TNE. The method may further comprise verifying the report associated with NE1. In some embodiments, the report associated with NE1 comprises an identity of NE1, a signature and trust evaluation information associated with NE1, wherein the signature comprises a timestamp. In some embodiments, the report may comprise a set of TEI associated with NE1 that helps to establish the trust relationship between NE1 and NE2. In some embodiments, the report may comprise a set of TEI associated with NE1 that helps NE2 to evaluate whether it is trustworthy to continue communication with NE1. In some embodiments, the report may particularly comprise one or more secure boot information of NE1, measured boot information of NE1, remote attestation information of NE1, highest Common Vulnerabilities and Exposer (CVE) score of NE1, a trust index of NE1, and a risk index of NE1.

Embodiments also include a second Network Entity (NE2) to establish communication between a first Network Entity (NE1) and the NE2, wherein both NE1 and NE2 trust a Trusted Network Entity (TNE). The NE2 comprises processing circuitry and memory. The memory contains instructions executable by the processing circuitry whereby the NE2 is configured establish an initial connection with the NE1. The NE2 may further be configured to obtain a report associated with NE1, wherein the report is signed by the TNE. The NE2 may further be configured to verify the report associated with NE1. In some embodiments, the report associated with NE1 comprises an identity of NE1, a signature and trust evaluation information associated with NE1, wherein the signature comprises a timestamp. In some embodiments, the report may comprise a set of TEI associated with NE1 that helps to establish the trust relationship between NE1 and NE2. In some embodiments, the report may comprise a set of TEI associated with NE1 that helps NE2 to evaluate whether it is trustworthy to continue communication with NE1. In some embodiments, the report may particularly comprise one or more secure boot information of NE1, measured boot information of NE1, remote attestation information of NE1, highest Common Vulnerabilities and Exposer (CVE) score of NE1, a trust index of NE1, and a risk index of NE1.

Some embodiments include a computer program product. The computer program product comprises computer-readable instructions stored in a non-transitory computer-readable storage medium of the computer program product. When the instructions are executed by processing circuitry (e.g., at least one processor) of the second network entity (NE2), they enable the NE2 to perform one or more of the described NE1 functionalities.

Some embodiments include a method performed by a Trusted Network Entity (TNE). The method may comprise obtaining a set of trust evaluation information of a Network Entity (NE). The method may further comprise generating a report associated with the NE, wherein the report is signed by the TNE. In some embodiments, the report associated with the NE comprises an identity of the NE, a signature and trust evaluation information associated with the NE, wherein the signature comprises a timestamp. In some embodiments, the report may comprise a set of TEI associated with the NE that helps to establish the trust relationship between the NE1 and another NE. In some embodiments, the report may comprise a set of TEI associated with the NE that helps another NE to evaluate whether it is trustworthy to continue communication with the NE. In some embodiments, the report may particularly comprise one or more secure boot information of the NE, measured boot information of the NE, remote attestation information of the NE, highest Common Vulnerabilities and Exposer (CVE) score of the NE, a trust index of the NE, and a risk index of the NE.

Some embodiments include a Trusted Network Entity (TNE) comprising processing circuitry and memory. The memory contains instructions executable by the processing circuitry whereby the TNE is configured to obtain a set of trust evaluation information of a Network Entity (NE). The TNE may further be configured to generate a report associated with the NE, wherein the report is signed by the TNE. In some embodiments, the report associated with the NE comprises an identity of the NE, a signature and trust evaluation information associated with the NE, wherein the signature comprises a timestamp. In some embodiments, the report may comprise a set of TEI associated with the NE that helps to establish the trust relationship between the NE1 and another NE. In some embodiments, the report may comprise a set of TEI associated with the NE that helps another NE to evaluate whether it is trustworthy to continue communication with the NE. In some embodiments, the report may particularly comprise one or more secure boot information of the NE, measured boot information of the NE, remote attestation information of the NE, highest Common Vulnerabilities and Exposer (CVE) score of the NE, a trust index of the NE, and a risk index of the NE.

Some embodiments include a computer program product. The computer program product comprises computer-readable instructions stored in a non-transitory computer-readable storage medium of the computer program product. When the instructions are executed by processing circuitry (e.g., at least one processor) of the Trusted Network Entity (TNE), they enable the TNE to perform one or more of the described NE1 functionalities.

Embodiments also include corresponding, computer programs, and carriers. A computer program comprises instructions which, when executed on at least one processor of a communication device or a communication equipment, cause the communication device or a communication equipment to carry out any of the embodiments described above. Embodiments further include a carrier containing such a computer program. This carrier may comprise one of an electronic signal, optical signal, radio signal, or computer readable storage medium.

Some embodiments may enable establishing higher level of trust between communicating entities compared to only having a certificate-based authentication and/or authorization. More data is available for a communicating party to make a decision to continue the communication to another communicating party or not. This means more granular access control can be established.

This summary is not an extensive overview of all contemplated embodiments, and is not intended to identify key or critical aspects or features of any embodiments or to delineate any embodiments. Other aspects and features will become apparent to those ordinarily skilled in the art upon review of the following description of specific embodiments with the figures.

BRIEF DESCRIPTION OF THE FIGURES

Exemplary embodiments will be described in more detail referring to the following figures, in which.

DETAILED DESCRIPTION

The embodiments set forth below represent information to enable those skilled in the art to practice the embodiments. Upon reading the following description, given the accompanying figures, those skilled in the art will understand the concepts of the description and will recognize applications of these concepts not addressed herein. These concepts and applications fall within the scope of the description.

In the following description, numerous specific details are set forth. However, it is understood that embodiments may be practiced without these specific details. In other instances, well-known circuits, structures, and techniques have not been shown in order not to obscure the understanding of the description. Those of ordinary skill in the art, with the included description, can implement appropriate functionality without undue experimentation.

Figure 1A:
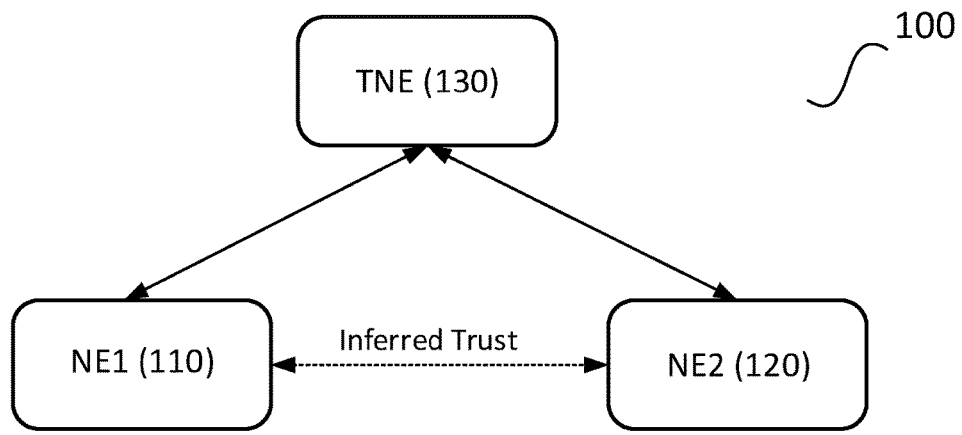
FIG. 1A is a schematic diagram illustrating an example of trust relationship between entities according to an embodiment.

Referring now to FIG. 1A, an example of a trust relationship between entities in a communication network 100 in which some embodiments may be deployed is depicted. The communication network 100 generally enable a network entity (NE1) 110 to communicate with a second network entity (NE2) 120. The communication network further comprises a third network entity 130 that is assumed to be trusted by both NE1 110 and NE2 120. The third network entity 130 may be referred to as a trusted network entity (TNE). The TNE 130 is assumed to collect information that helps to establish trust relationship between network entities (e.g. NE1 and NE2) in the communication network 100. The information may also help a network entity (e.g. NE1) to evaluate whether it is trustworthy to continue to establish communication with another network entity (e.g. NE2). Such information may relate to secure boot/trusted boot, remote attestation status, use of secure storage, use of secure enclaves, etc. This kind of information may be referred to as trust evaluation information (TEI) in this document.

Whenever the NE1 110 wants to establish communication with NE2 120, NE1 110 will establish an initial connection with NE2 120. Then it will provide a report associated with NE1 110, wherein the report is signed by TNE 130, to NE2 120. The report associated with NE1 may comprise an identity of NE1, a signature and trust evaluation information associated (TEI) with NE1, and wherein the signature comprises a timestamp. Based, at least in part, on this report, NE2 120 can then decide whether to continue the communication with NE1 110 or not. In a stricter security deployment scenario (e.g. where mutual authentication is needed), NE2 120 will send a similar report associated with NE2 120, based on which NE1 110 will decide whether to further continue the communication with NE2 120 or not.

In one embodiment, TNE 130 monitors both NE1 110 and NE2 120 periodically to obtain the number of unpatched known vulnerabilities and the highest Common Vulnerabilities and Exposer (CVE) score of known vulnerabilities in both of these entities. When NE1 asks for the TEI related to itself, TNE generates a report of these number of unpatched vulnerabilities and the highest CVE score along with the CVE number of these known vulnerabilities. Additionally, the TNE may add a list of all the known vulnerabilities in this report. This can be generated by using a typical vulnerability scanning tool. Finally, the TNE 130 signs the report and sends it back to NE1 110. When NE2 120 asks for a report associated with NE1 110, NE1 110 provides the report associated with NE1 110 received from TNE 130 to NE2 120. Upon receiving the report associated with NE1 110, NE2 120 checks the signature included in the report to ensure that it is coming from a trusted network entity (e.g. TNE 130) and it has not been modified. Then NE2 120 inspects the actual content of the report to find the number of unpatched vulnerabilities and the highest CVE score and the CVE number. If the policy within NE2 states that it will not allow any connection to be made if there are more than certain number of unpatched vulnerabilities in a system and/or the highest CVE score is more than a certain number (e.g. 7) then NE2 120 will drop the connection with NE1 110. Additionally, NE2 120 can inform NE1 110 that its security policy does not allow to keep the communication because of security policy violation. NE2 120 could store additional policies. For instance, one such policies could indicate that NE2 120 must refrain from continuing the communication with NE1 110 if the report associated with NE1 110 lists one or more specific vulnerabilities.

In another embodiment, the TNE itself may generate a trust index and/or a risk index associated with a network entity (e.g. NE1 110) that is, for example, a number between 1 to 10. The trust index gives a snapshot to policy compliance status based on different characteristics requirements e.g. security, privacy, resilience, reliability and safety, and the respective controls deployed for an asset. The risk index calculator performs a risk level calculation for the known threats and vulnerabilities using risk calculation formulas. This trust index and/or risk index number can be included in a report associated with NE1. Upon receiving the report, NE2 120 will check the trust index number and/or the risk index number included in the report. NE2 120 may have a local policy that states to only accept connections with a network entity having a trust index and/or a risk index of certain number. According to the local policy, NE2 120 will decide whether to continue or drop the communication with NE1 110 based on the received trust index and risk index number included in the report.

There are three different options for deploying a TNE 130 in the network:

Option 1: The TNE is operated by the operator of the two communicating parties (e.g. NE1 110 and NE2 120).

Option 2: The TNE is not operated by any operator of the communicating parties (e.g. NE1 110 or NE2 120).

Option 3: The TNE 130 is operated by one of the operators of the communicating parties (e.g. NE1 110 or NE2 120).

Option 1 is easier to setup since the communicating parties can develop and use the proprietary application programming interfaces (API) of the same operator, e.g. an enterprise. Furthermore, a vast amount of original TEI data can be collected from all the communicating parties as they all belong to the same enterprise and the enterprise is able to control this data by itself. All this information can be collected in a much more reliable way compared to option 2 and 3 as all the components are operated and managed by the same organization. Of course, there could be situations where some network nodes are deployed in an infrastructure not owned by the same organization (e.g. public clouds), then the obtained original TEI data could be marked as less reliable and policies can be set by the organization on how to deal with such original TEI data. This option is also very reasonable for any enterprise networks (e.g. telecommunication networks managed by one operator) where there are a large number of nodes communicating with each other. In this case, the enterprise just needs to add one more node as TNE, into its network architecture.

Option 2 is for a typical open internet paradigm where the two network entities (e.g. NE1 110 and NE2 120) do not have any prior trust agreement and they solely trust an independent 3rd party (e.g. TNE 130) to facilitate the original TEI data. In this case, to provide a reliable TEI report by a 3rd party is rather hard, and the available information could be vastly limited. Furthermore, some sort of standard interfaces would be required to send and collect original TEI data from the TNE.

Option 3 adds some improvement over the 2nd option. In this case the TNE can collect a large number of original TEI data reliably for one of the communicating parties that has a trust relationship with TNE, but the other communicating party does not necessarily trust the TNE as much as in option 1. One practical example of this option 3 could arise in a roaming scenario. For example, a network function (NF) of a Visited Public Land Mobile Network (VPLMN) wants to establish higher levels of trust with a network function (NF) of Home Public Land Mobile Network (HPLMN) of a subscriber. After authentication, the VPLMN NF requests the TEI report associated with the NF. The TNE of the HPLMN generates a TEI report associated with the NF in the HPLMN. The VPLMN has no way to verify the TEI in this case and thus has no choice but to trust it. The VPLMN can only be sure that the TEI report comes from an authentic source and it has not been tampered in its way. Thus, the trust level will depend on the internal policy of the VPLMN that how much it can trust the TEI report received from a particular HPLMN. This could possibly depend on the business relationships, geo-political scenarios, previous history on how security is managed in the HPLMN, etc. The same thing can happen for the NF in HPLMN which may in turn ask for a TEI report from a NF in VPLMN.

Figure 1B:
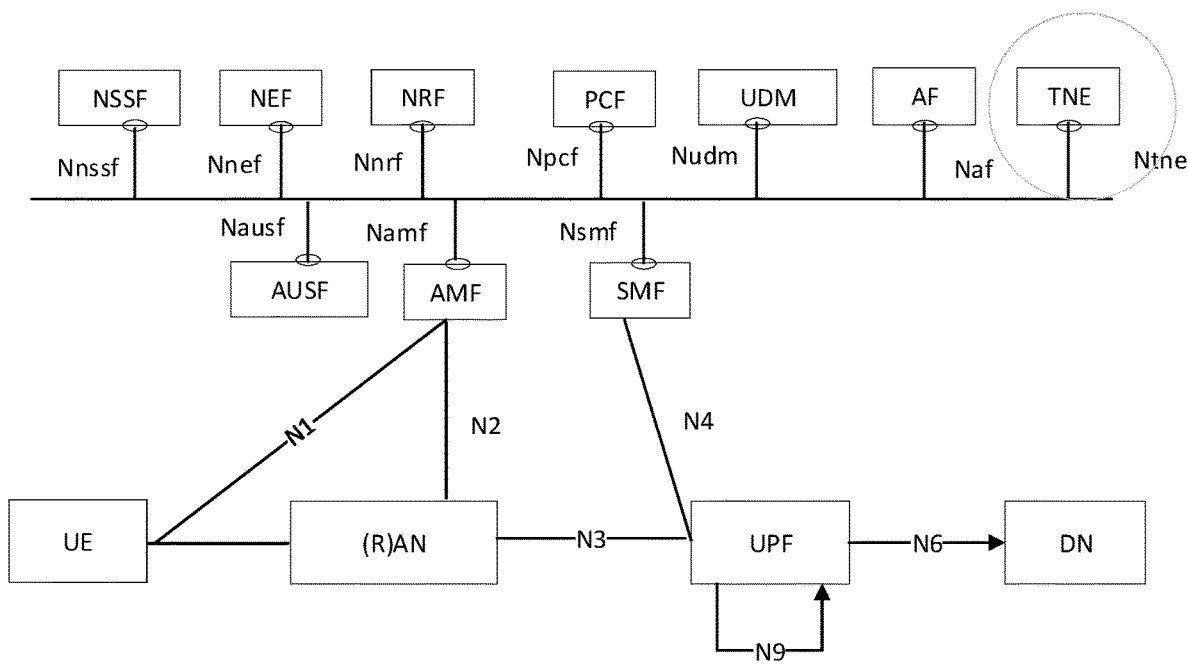
FIG. 1B is a schematic diagram illustrating an example of a network architecture according to an embodiment.

In some embodiments, a service provider has deployed its network infrastructure using 5G Service Based Architecture (SBA). A TNE is deployed as an additional service in the SBA. FIG. 1B depicts how a TNE can be added to the SBA. Although FIG. 1B shows that the TNE is connected to all the other nodes via SBA, in reality the TNE should connect to all the individual nodes as soon as they are added and start collecting original TEI data from them.

In some embodiments, TNE is tied up with the NF repository function (NRF), that keeps the record of all the NF instances and their supported services. In this way, the TNE will get instant notification of what are the available NF services and instances running in the network. With this knowledge then the TNE can probe into those services for original TEI data. One way that the TNE gets the relevant original TEI data is that all the nodes are equipped with an agent collecting original TEI data from those nodes and then pass them on to the TNE. Then, using the SBA deployment, all the other nodes also know where to find the TNE service from the NRF. Even if the APIs are not standardized for the TNE, the solution could easily work as the TNE is operating in a controlled environment under one organization. Hence, a proprietary API solution will work and will provide greater flexibility.

Figure 2:
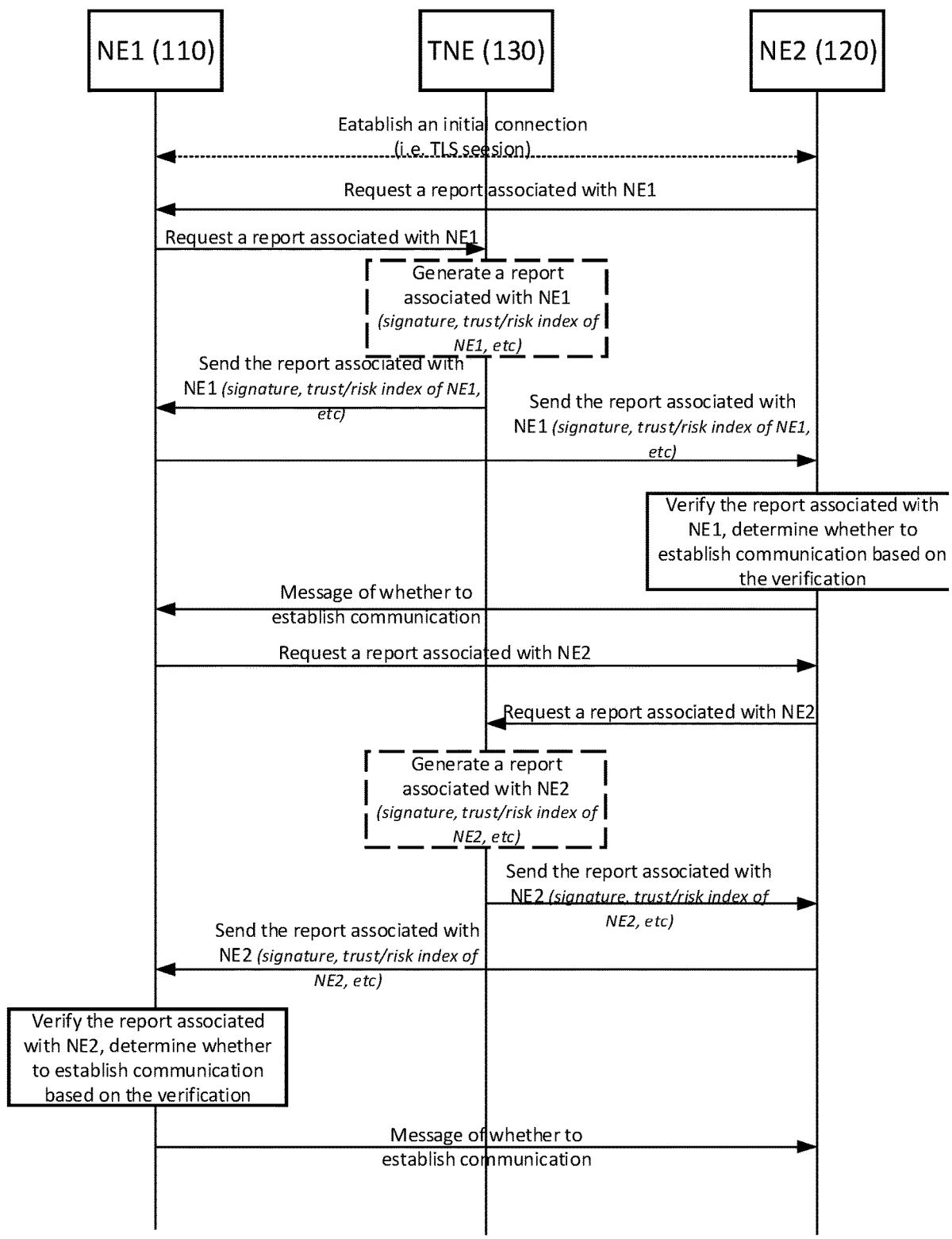
FIG. 2 is a signaling and operating diagram according to some embodiments.

Turning now to FIG. 2, an example of a signaling and operating diagram according to some embodiments is depicted.

When a first network entity (NE1) 110 wants to establish communication with a second network entity (NE2) 120, wherein both NE1 and NE2 trust a trusted network entity (TNE) 130, the below steps may be implemented.

1) NE1 establishes an initial connection with NE2. In some embodiments, the initial connection is an encrypted connection. In some embodiments, the encrypted connection is based on Transport Layer Security (TLS) protocol or on Datagram Transport Layer Security (DTLS) protocol.

2) NE2 requests a report associated with NE1 110, wherein the report is signed by TNE 130. In some embodiments, NE2 120 may send the request to NE1 110. In other embodiments, NE2 120 may send the request directly to the TNE 130 (not shown in FIG. 2).

3)-4) If NE2 120 sends the request to NE1 110, NE1 110 will first check that whether it already has a valid report. If not, NE1 110 needs to send a request for the report associated with NE1 110 to TNE 130. Upon receiving the request from NE1 110, TNE 130 sends the report associated with NE1 110 to NE1 110. The report associated with NE1 110 comprises an identity of NE1 110, a signature and trust evaluation information (TEI) associated with NE1. The signature has a timestamp when it's signed. In some embodiments, the report may comprise a set of TEI associated with NE1 110 that helps to establish the trust relationship between NE1 110 and NE2 120. In some embodiments, the report may comprise a set of TEI associated with NE1 110 that helps NE2 120 to evaluate whether it is trustworthy to continue communication with NE1 110. In some embodiments, the report may particularly comprise one or more secure boot information of NE1 110, measured boot information of NE1 110, remote attestation information of NE1 110, highest Common Vulnerabilities and Exposer (CVE) score of NE1 110, a trust index of NE1 110, and a risk index of NE1 110.

In other embodiments, TNE 130 may push the report associated with NE1 110 periodically (not shown in FIG. 2).

5) When NE1 110 obtains the report associated with NE1 110, NE1 110 sends it to NE2 120. In some embodiment, NE1 110 may sign the report with its certificate before sending the report to NE2 120. In other embodiments, if NE2 120 sends the request for the report associated with NE1 110 directly to TNE 130 in step 2), TNE 130 will send the report to NE2 120 directly (not shown in FIG. 2).

6) When NE2 120 receives the report associated with NE1 110, NE2 120 verifies the report associated with NE1 110 and determines whether to continue the communication based on the verification. In some embodiments, the verification comprises verify the signature included in the report. Further, the verification may comprise verify the timestamp of the signature. NE2 120 may request a new report associated with NE1 110 if the timestamp of the received report indicates that it is outside the acceptable time period defined by a policy in NE2 120.

In some embodiments, the determination further comprises determining whether to continue the communication with NE1 110 based on one or more of the TEI included in the report associated with NE1 110: secure boot information of NE1 110, measured boot information of NE1 110, remote attestation information of NE1 110, highest Common Vulnerabilities and Exposer (CVE) score of NE1 110, a trust index of NE1 110, and a risk index of NE1 110. In some embodiments, the determination further comprises determining whether to continue the communication with NE1 110 based on one or more local policies of the NE2 120.

In some embodiment, if NE1 110 signs the report with its certificate before sending the report associated with NE1 110 to NE2 120, NE2 120 needs to verify the certificate of NE1 110 before verifying the signature comprised in the report.

7) After the verification, NE2 120 sends a message of whether to continue the communication with NE1 110 to NE1 110. In other words, if NE2 120 agrees to continue the communication with NE1 110, NE2 120 will send an acknowledge message to NE1 110 indicating that NE2 120 determines to continue the communication. If NE2 120 rejects to continue the communication with NE1 110, NE2 120 will send a reject message to NE1 110 to stop the communication, thus the process is over in step 7.

8) If NE1 110 receives an acknowledge message that NE2 120 determines to continue the communication with NE1 110, NE1 110 may continue the communication with NE2 120 or NE1 110 may further request a report associated with NE2 120, wherein the report is signed by TNE 130. Similarly, as step 2), in some embodiments, NE1 110 may send the request to NE2 120. In other embodiments, NE1 110 may send the request directly to the TNE 130 (not shown in FIG. 2). Understandably, NE1 110 does not need to wait for a decision from NE2 120 to request a report associated with NE2 120. In that sense, NE1 110 may request such a report associated with NE2 120 at any time after the initial connection is established. In some embodiments, NE1 110 may request a report associated with NE2 120 just after the initial connection is established. (Not shown in FIG. 2).

9)-10) If NE1 110 sends the request to NE2 120, NE2 sends a request for the report associated with NE2 120 to TNE 130. Upon receiving the request from NE2 120, TNE 130 sends the report associated with NE2 120 to NE2 120. The report associated with NE2 120 comprises an identity of NE1 110, a signature and trust evaluation information (TEI) associated with NE2. The signature has a timestamp when it's signed. In some embodiments, the report may comprise a set of TEI associated with NE2 120 that helps to establish the trust relationship between NE1 110 and NE2 120. In some embodiments, the report may comprise a set of TEI associated with NE2 120 that helps NE1 110 to evaluate whether it is trustworthy to continue communication with NE2 120. In some embodiments, the report may comprise one or more secure boot information of NE2 120, measured boot information of NE2 120, remote attestation information of NE2 120, highest Common Vulnerabilities and Exposer (CVE) score of NE2 120, a trust index of NE2 120, and a risk index of NE2 120.

In other embodiments, TNE 130 may push the report associated with NE2 120 periodically (not shown in FIG. 2).

11) When NE2 120 receives the report associated with NE2 120 from TNE 130, NE2 120 sends it to NE1 110. In some embodiments, NE2 120 may sign the report associated with NE2 120 with its certificate before sending the report to NE1 110. In other embodiments, if NE1 110 sends the request for the report associated with NE2 120 directly to TNE 130 in step 8), TNE 130 will send the report to NE1 110 directly (not shown in FIG. 2).

12) When NE1 110 receives the report associated with NE2 120, NE1 110 verifies the report associated with NE2 120 and determines whether to continue communication based on the verification. In some embodiments, the verification comprises verifying the signature included in the report. Further, the verification may comprise verifying the timestamp of the signature. NE1 110 may request a new report associated with NE2 120 if the timestamp of the received report indicates that it is outside the acceptable time period defined by a policy in NE1 110.

In some embodiments, the determination further comprises determining whether to continue communication with NE2 120 based on one or more of the information included in the report associated with NE2 120: secure boot information of NE2 120, measured boot information of NE2 120, remote attestation information of NE2 120, highest Common Vulnerabilities and Exposer (CVE) score of NE2 120, a trust index of NE2 120, and a risk index of NE2 120. In some embodiments, the determination further comprises determining whether to continue the communication with NE2 120 based on a local policy of NE1 110.

In some embodiments, if NE2 signs the report associated with NE2 120 with its certificate before sending the report to NE1 110, NE1 needs to verify the certificate of NE2 120 before verifying the signature comprised in the report.

13) After the verification, NE1 110 sends a message of whether to continue communication with NE2 120 to NE2 120. In other words, if NE1 110 agrees to continue the communication with NE2 120, NE1 110 will send an acknowledge message to NE2 120 indicating that NE1 110 determines to continue the communication. If NE1 110 rejects to continue communication with NE2 120, NE1 110 will send a reject message to NE2 120 to stop the communication, thus the process is over in step 13.

14) If NE2 120 receive an acknowledge message that NE1 110 determines to continue communication with NE2 120, the communication between NE1 110 and NE2 120 is established.

As discussed in FIG. 1, TNE 130 can collect TEI of any network entities (e.g. NE1 and NE2) that trust TNE 130 and generates a report for each network entity, wherein the report comprises a signature.

There are several ways for the TNE 130 to collect original TEI data of network entities (e.g. NE1 110 and NE2 120) in a communication network. For example, TNE 130 may collect the original TEI data directly from the infrastructure where the network entity is running. Or TNE 130 may have an agent installed into a network entity. The agent could periodically update the status of the network entity or if there are any critical changes. The agent could report promptly to the TNE 130. Based on these original TEI data, TNE 130 will create an up-to-date TEI report for the respective NEs in the communication network In some embodiments, a NE may want to limit what kind of TEI it would like to provide or request. Thus, the NE may indicate what kind of TEI it would like to include in the TEI report when the NE sends a request for a TEI report to the TNE. For example, the communicating parties may request particular attributes to be present in the TEI report. This may be crucial in some cases where, for example, a communicating entity wants to make sure whether the remote entity has gone through a secure boot process or not.

Figure 3:
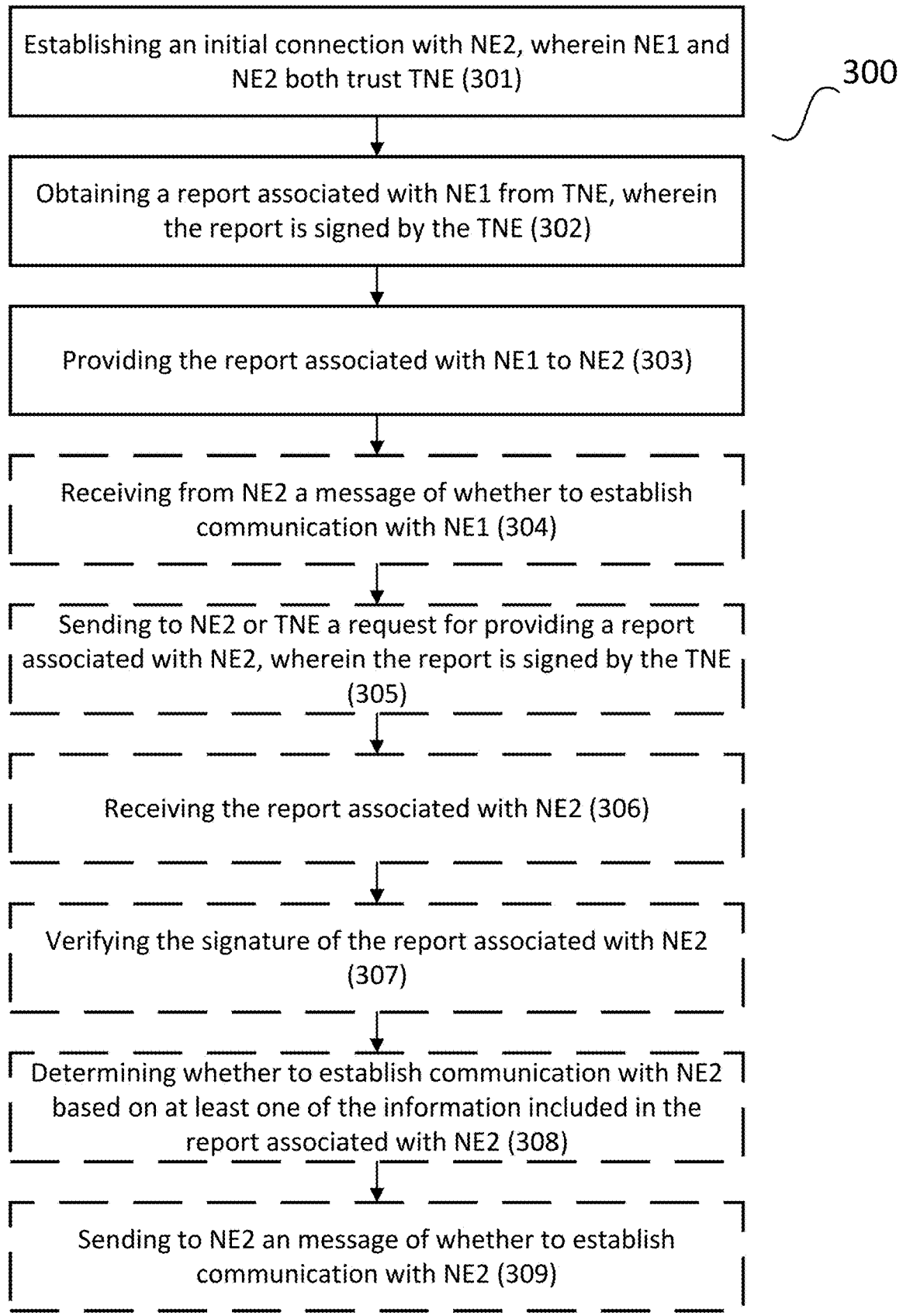
FIG. 3 is a flow chart of operations of a network entity according to some embodiments.

Referring to FIG. 3, a flow chart of method 300 performed by a (first) network entity (e.g. NE1) according to some embodiments is illustrated. Blocks in dashed lines are optional. The method 300 in some embodiments may comprise establishing an initial connection with NE2, wherein NE1 and NE2 both trust TNE (block 301), obtaining a report associated with NE1 from TNE, wherein the report is signed by TNE (block 302), and providing the report associated with NE1 to NE2 (block 303). In some embodiments, the report associated with NE1 may comprise an identity of NE1, a signature and trust evaluation information (TEI) associated with NE1. The signature has a timestamp when it's signed. In some embodiments, the report may comprise a set of TEI associated with NE1 110 that helps to establish the trust relationship between NE1 110 and NE2 120. In some embodiments, the report may comprise a set of TEI associated with NE1 110 that helps NE2 120 to evaluate whether it is trustworthy to continue communication with NE1 110. In some embodiments, the report may particularly comprise one or more secure boot information of NE1 110, measured boot information of NE1 110, remote attestation information of NE1 110, highest Common Vulnerabilities and Exposer (CVE) score of NE1 110, a trust index of NE1 110, and a risk index of NE1 110.

Further, in some embodiments, the step of establishing an initial connection with NE2 may comprise establishing an encrypted connection with NE2. In some embodiments, the encrypted connection may be based on Transport Layer Security (TLS) protocol or on Datagram Transport Layer Security (DTLS) protocol. Further, in some embodiments, the step of obtaining a report associated with NE1 may comprise sending a request to TNE for a report associated with NE1. In other embodiments, the step of obtaining a report associated with NE1 may comprise receiving a report associated with NE1 from TNE. Further, in some embodiments, the step of providing the report associated with NE1 to NE2 may comprise receiving from NE2 a request for providing a report associated with NE1.

In some embodiments, the method 300 may further comprise receiving from NE2 a message of whether to continue communication with NE1 (block 304). In some embodiments, the method 300 may further comprise sending to NE2 or TNE a request for providing a report associated with NE2, wherein the report is signed by the TNE (block 305). In some embodiments, the method 300 may comprise receiving the report associated with NE2 (block 306). Further, the report associated with NE2 may comprise an identity of NE2, a signature and trust evaluation information associated with NE2. The signature has a timestamp when it's signed. In some embodiments, the report may comprise a set of TEI associated with NE2 120 that helps to establish the trust relationship between NE1 110 and NE2 120. In some embodiments, the report may comprise a set of TEI associated with NE2 120 that helps NE1 110 to evaluate whether it is trustworthy to continue communication with NE2 120. In some embodiments, the report may comprise one or more secure boot information of NE2 120, measured boot information of NE2 120, remote attestation information of NE2 120, highest Common Vulnerabilities and Exposer (CVE) score of NE2 120, a trust index of NE2 120, and a risk index of NE2 120.

In some embodiments, the method 300 may further comprise verifying the signature of the report associated with NE2 (block 307). Further, the step of verifying the signature of the report associated with NE2 may comprise verifying the timestamp of the signature. Further, the step of verifying the timestamp of the signature may comprise requesting a new report associated with NE2 if the timestamp of the received report associated with NE2 indicates that it is outside the acceptable time period defined by a policy in NE1.

In some embodiments, the method 300 may further comprise determining whether to continue communication with NE2 based on one or more of the information included in the report associated with NE2 (block 308). The information included in the report associated with NE2 may comprise secure boot information of NE2, measured boot information of NE2, remote attestation information of NE2, highest Common Vulnerabilities and Exposer (CVE) score of NE2, a trust index of NE2, and a risk index of NE2. In some embodiments, the determination further comprises determining whether to continue the communication with NE2 120 based on a local policy of NE1 110.

In some embodiments, the method 300 may further comprise sending to NE2 a message of whether to continue communication with NE2 (block 309).

Figure 4:
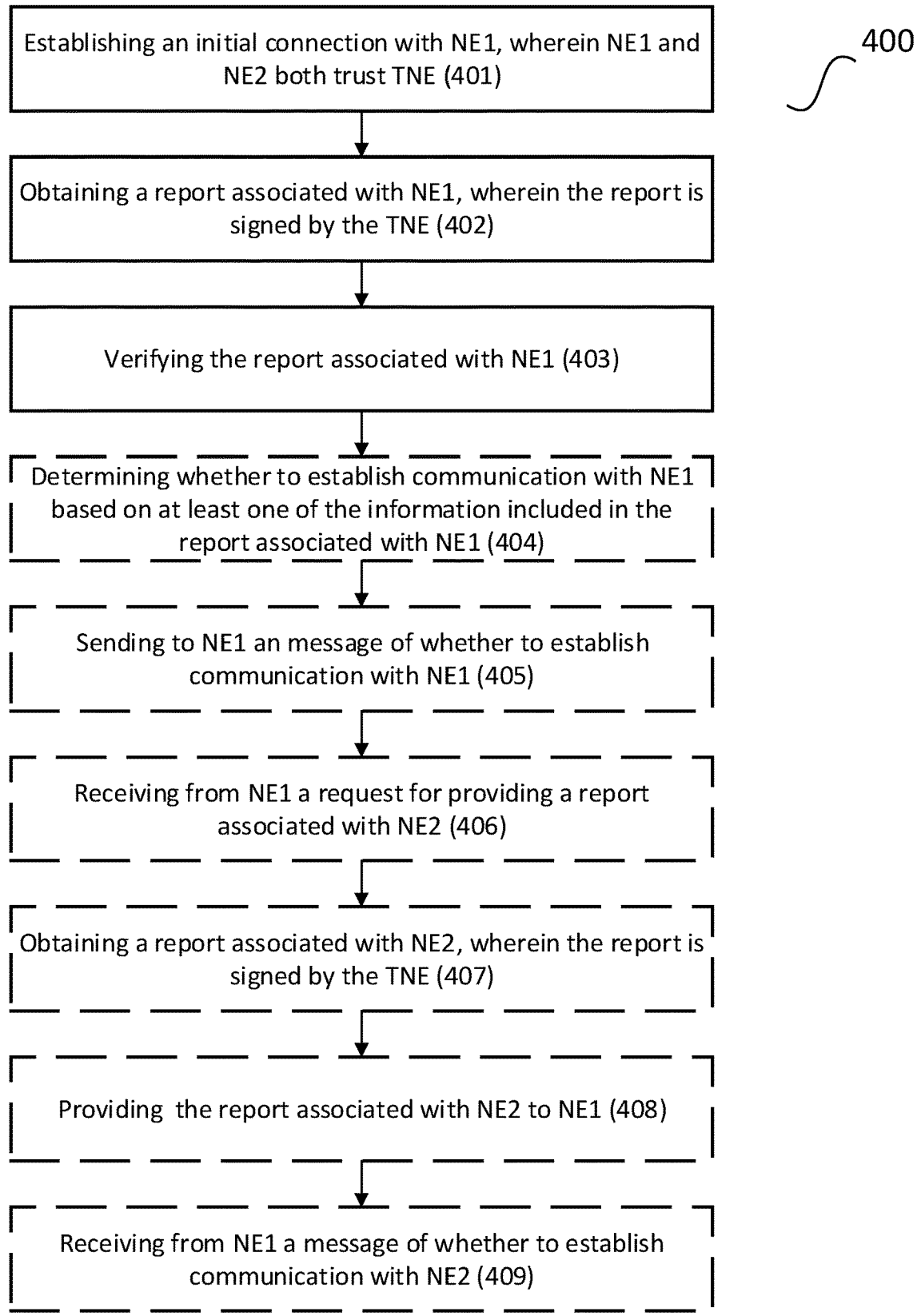
FIG. 4 is another flow chart of operations of a network entity according to some embodiments.

Referring to FIG. 4, a flow chart of method 400 performed by a (second) network entity (e.g. NE2) according to some embodiments is illustrated. Blocks in dashed lines are optional. The method 400 in some embodiments may comprise establishing an initial connection with NE1, wherein NE1 and NE2 both trust TNE (block 401), obtaining a report associated with NE1, wherein the report is signed by the TNE (block 402) and verifying the report associated with NE1 (block 403). The report associated with NE1 may comprise an identity of NE1, a signature and trust evaluation information (TEI) associated with NE1. The signature has a timestamp when it's signed. In some embodiments, the report may comprise a set of TEI associated with NE1 110 that helps to establish the trust relationship between NE1 110 and NE2 120. In some embodiments, the report may comprise a set of TEI associated with NE1 110 that helps NE2 120 to evaluate whether it is trustworthy to continue communication with NE1 110. In some embodiments, the report may particularly comprise one or more secure boot information of NE1 110, measured boot information of NE1 110, remote attestation information of NE1 110, highest Common Vulnerabilities and Exposer (CVE) score of NE1 110, a trust index of NE1 110, and a risk index of NE1 110.

Further, in some embodiments, the step of establishing an initial connection with NE1 may comprise establishing an encrypted connection with NE1. In some embodiments, the encrypted connection may be based on Transport Layer Security (TLS) protocol or on Datagram Transport Layer Security (DTLS) protocol. Further, in some embodiments, the step of obtaining a report associated with NE1 may comprise sending a request to NE1 or TNE for a report associated with NE1. Further, in some embodiments, the step of obtaining a report associated with NE1 further comprises receiving the report associated with NE1 from NE1 or TNE. In some embodiments, the step of verifying the signature of the report associated with NE1 may comprise verifying the timestamp of the signature. Further, the step of verifying the timestamp of the signature may comprise requesting a new report associated with NE1 if the timestamp of the received report associated with NE1 indicates that it is outside the acceptable time period defined by the policy in NE1.

In some embodiments, the method 400 may further comprise determining whether to continue communication with NE1 based on at least one of the information included in the report associated with NE1 (block 404).

In some embodiments, the report may comprise a set of TEI associated with NE1 110 that helps to establish the trust relationship between NE1 110 and NE2 120. In some embodiments, the report may comprise a set of TEI associated with NE1 110 that helps NE2 120 to evaluate whether it is trustworthy to continue communication with NE1 110. In some embodiments, the report may particularly comprise one or more secure boot information of NE1 110, measured boot information of NE1 110, remote attestation information of NE1 110, highest Common Vulnerabilities and Exposer (CVE) score of NE1 110, a trust index of NE1 110, and a risk index of NE1 110. In some embodiments, the determination further comprises determining whether to continue the communication with NE1 110 based on a local policy of NE2 120.

In some embodiments, the method 400 may further comprise sending to NE1 a message of whether to continue communication with NE1 (block 405).

In some embodiments, the method 400 may further comprise receiving from NE1 a request for providing a report associated with NE2 (block 406).

In some embodiments, the method 400 may further comprise obtaining a report associated with NE2, wherein the report is signed by the TNE (block 407). In some embodiments, the step of obtaining a report associated with NE2 may comprise obtaining a report associated with NE2 from TNE. Further, in some embodiments, the step of obtaining a report associated with NE2 may comprise sending a request to TNE for a report associated with NE2. In other embodiments, the step of obtaining a report associated with NE2 may comprise receiving a report associated with NE2 from TNE periodically.

In some embodiments, the method 400 may further comprise providing the report associated with NE2 to NE1 (block 408).

In some embodiments, the method 400 may further comprise receiving from NE1 a message of whether to continue communication with NE2 (block 409).

Figure 5:
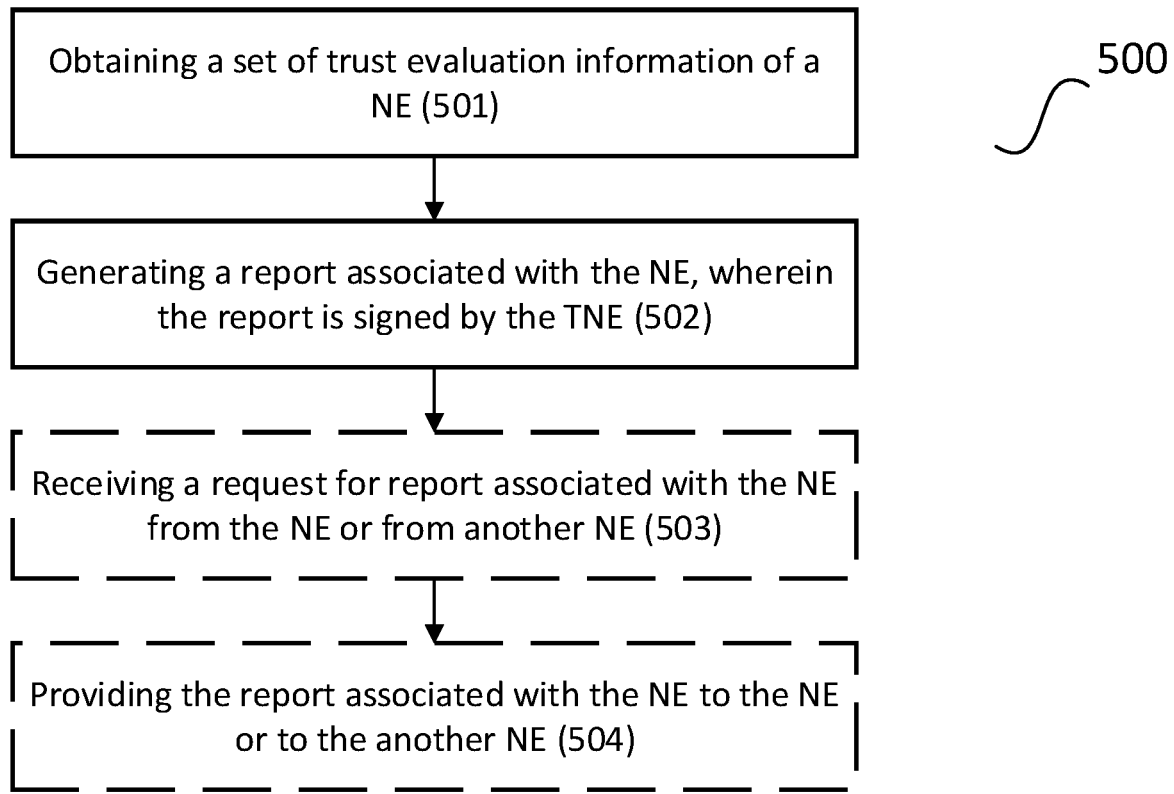
FIG. 5 is a flow chart of operations of a trusted network entity according to some embodiments.

Referring to FIG. 5, a flow chart of method 500 performed by a network entity (e.g. TNE) according to some embodiments is illustrated. Blocks in dashed lines are optional. The method 500 in some embodiments may comprise obtaining a set of trust evaluation information of a NE (block 501) and generating a report associated with the NE, wherein the report is signed by the TNE (block 502). In some embodiments, the report associated with a NE may comprise an identity of NE, a signature and trust evaluation information (TEI) associated with the NE. The signature has a timestamp when it's signed. In some embodiments, the report may comprise a set of TEI associated with the NE that helps to establish the trust relationship between the NE and another NE. In some embodiments, the report may comprise a set of TEI associated with the NE that helps another NE to evaluate whether it is trustworthy to continue communication with the NE. In some embodiments, the report may particularly comprise one or more secure boot information of the NE, measured boot information of the NE, remote attestation information of the NE, highest Common Vulnerabilities and Exposer (CVE) score of the NE, a trust index of the NE, and a risk index of the NE.

In some embodiments, the method 500 further comprises receiving a request for a report associated with the NE from the NE or from another NE (block 503).

In some embodiments, the method 500 further comprises providing the report associated with the NE to the NE or to another NE (block 504). Further, in some embodiments, the step of providing the report associated with the NE to the NE may comprise providing the report upon receiving a request from the NE or pushing report to the NE (e.g., periodically). In other embodiments, the step of providing the report associated with the NE to another NE may further comprise providing the report upon receiving a request from the another NE.

It is to be noted that in the previously described signaling and operating diagram(s) and/or flow chart(s), unless the description clearly indicates a certain relationship (e.g., causal, conditional, temporal, etc.) between two or more actions, the described actions may be performed in a different sequence than the one illustrated. For example, two actions shown performed in succession may be performed substantially concurrently, or even in the reverse order. Hence, the illustrated sequence of actions is only indicative of one sequence of actions and does not suggest that this is the only possible sequence. Also, the blocks in dashed lines may be considered optional, at least in some embodiments.

Some embodiments of a network entity (e.g. NE1 110, NE2 120) and a trusted network entity (e.g. TNE130) will now be described in view of FIG. 6 and FIG. 7. The network entity and trusted network entity could be any kind of networked entity including wireless device, wired device and network function.

Figure 6:
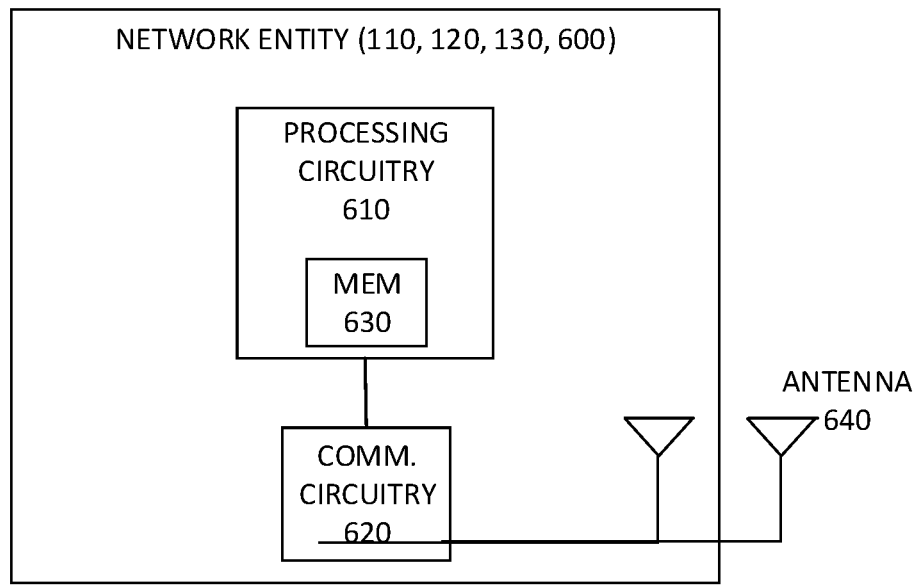
FIG. 6 is a block diagram of a network entity according to some embodiments.

FIG. 6 is a block diagram of an example of a wireless device 600 according to some embodiments. Wireless device 600 includes processing circuitry 610 and communication circuitry 620. As shown, the communication circuitry 620 (e.g., radio circuitry) is configured to transmit and/or receive information to and/or from one or more other nodes, e.g., via any communication technology. Such communication may occur via one or more antennas 640 that are either internal or external to the wireless device 600. The processing circuitry 610 is configured to perform processing described above (e.g., in FIGS. 2-5), such as by executing instructions stored in memory 630. The processing circuitry 610 in this regard may implement certain functional means, units, or modules.

Figure 7:
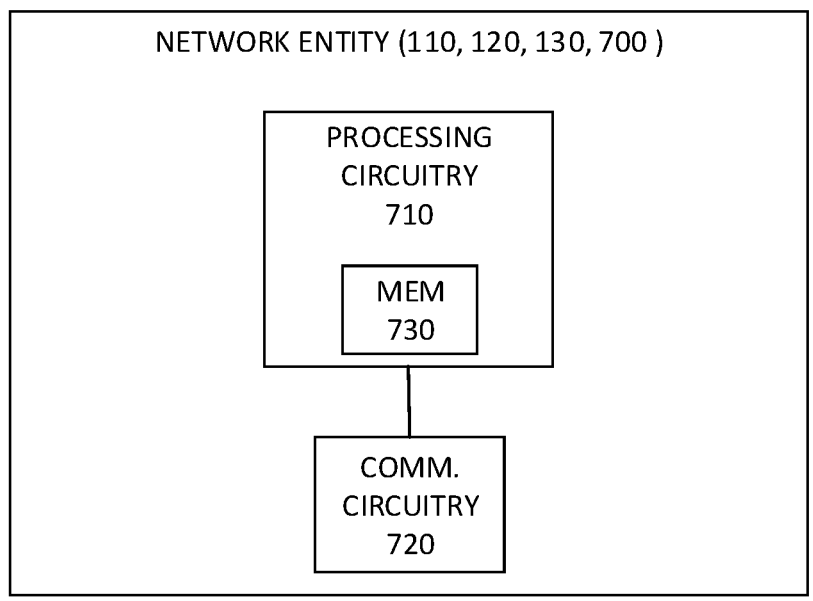
FIG. 7 is another block diagram of a network entity according to some embodiments.

FIG. 7 is a block diagram of an example of a wired device or network function 700 according to some embodiments. As shown, the wired device or network function 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above (e.g., in FIGS. 2-5), such as by executing instructions stored in memory 730. The processing circuitry 710 in this regard may implement certain functional means, units, or modules.

A computer program comprises instructions which, when executed on at least one processor of a wireless device, wired device, or network function, cause the wireless device, wired device or network function to carry out any of the respective processing described above. A computer program in this regard may comprise one or more code modules configured to perform one or more steps of the processing described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a wireless device, wired device or network function, cause the wireless device, wired device or network function to perform as described above.

Embodiments further include a computer program product comprising program code portions for performing the steps of any of the embodiments herein when the computer program product is executed by a computing device. This computer program product may be stored on a computer readable recording medium.

In some embodiments, any of NE1, NE2 and TNE may be a wireless device, e.g. a mobile phone, a user equipment or a wireless sensor in internet of thing (IoT). In other embodiments, any of NE1, NE2 and TNE may be a wired device, e.g. a computer or server in any kind of network system. In other embodiments, any of NE1, NE2 and TNE may implement as a virtualized function or a network function which may co-exist with another network function, e.g. it may co-exist with a network function in 3GPP network system.

References in the specification to "one embodiment," "an embodiment," "an example embodiment," etc., indicate that the embodiment described may include a particular feature or a particular combination of features (e.g., component(s), element(s), integer(s), structure(s), operation(s), and/or step (s)), but every embodiment may not necessarily include the particular feature or the particular combination of features. Such phrases are not necessarily referring to the same embodiment. Further, when a particular feature, or a particular combination of features, is described in connection with an embodiment, it is submitted that it is within the knowledge of one skilled in the art to implement such feature, or combination of features, in connection with other embodiments whether or not explicitly described.

As used herein, the singular forms "a," "an," and "the" should include the plural forms, unless the context indicates otherwise. It will be further understood that the terms "comprises," "comprising," "includes," and/or "including"

when used, specify the presence of the stated feature or features, but do not preclude the presence or addition of one or more other features.

Unless otherwise defined, all terms (including technical and scientific terms) used herein have the same meaning as commonly understood by one of ordinary skill in the art to which this invention belongs. It will be further understood that terms used should be interpreted as having a meaning that is consistent with their meaning in the context of this specification and the relevant art and will not be interpreted in an idealized or overly formal sense unless expressly so defined herein.

In the specification, the terms "coupled" and "connected," along with their derivatives, may be used. It should be understood these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The above-described embodiments are examples only. Alterations, modifications and variations may be affected to the particular embodiments by those of skill in the art without departing from the scope of the description, which is defined solely by the appended claims.

The invention claimed is:

1. A method performed by a first Network Entity (NE1) to establish communication between the NE1 and a second Network Entity (NE2), wherein both NE1 and NE2 trust a Trusted Network Entity (TNE), the method comprising:
   establishing an initial connection between NE1 and NE2;
   obtaining a report associated with NE1 from TNE, the report being signed by the TNE, the report comprising an identity of NE1, a signature, and trust evaluation information (TEI) associated with NE1, the signature comprising a timestamp; and
   providing the report associated with NE1 to NE2.

2. The method according to claim 1, wherein the report associated with NE1 comprise a set of TEI associated with NE1 that helps to establish the trust relationship between NE1 and NE2, or wherein the report associated with NE1 comprise a set of TEI associated with NE1 that helps NE2 to evaluate whether it is trustworthy to continue communication with NE1.

3. The method according to claim 1, wherein the TEI associated with NE1 comprises at least one of:
   secure boot information of NE1,
   measured boot information of NE1,
   remote attestation information of NE1,
   Highest Common Vulnerabilities and Exposer (CVE) score of NE1,
   trust index of NE1, and a risk index of NE1.

4. The method according to claim 1, further comprising receiving from NE2 a message of whether to continue communication with NE1.

5. The method according to claim 1, further comprising sending to NE2 or TNE a request for providing a report associated with NE2, wherein the report is signed by the TNE.

6. A method performed by a second Network Entity (NE2) to establish communication between a first Network Entity (NE1) and the NE2, wherein both NE1 and NE2 trust a Trusted Network Entity (TNE), the method comprising:
   establishing an initial connection between NE2 and NE1;
   obtaining a report associated with NE1, the report being signed by TNE, the report comprising an identity of NE1, a signature, and trust evaluation information (TEI) associated with NE1, the signature comprising a timestamp; and
   verifying the report associated with NE1.

7. The method according to claim 6, wherein the report associated with NE1 comprise a set of TEI associated with NE1 that helps to establish the trust relationship between NE1 and NE2, or wherein the report associated with NE1 comprise a set of TEI associated with NE1 that helps NE2 to evaluate whether it is trustworthy to continue communication with NE1.

8. The method according to claim 6, wherein the TEI associated with NE1 comprises at least one of:
   secure boot information of NE1,
   measured boot information of NE1,
   remote attestation information of NE1,
   Highest Common Vulnerabilities and Exposer (CVE) score of NE1,
   a trust index of NE1, and
   risk index of NE1.

9. The method according to claim 6, further comprising sending a message of whether to continue communication with NE1 to NE1.

10. A method performed by a Trusted Network Entity (TNE), the method comprising:
    obtaining a set of trust evaluation information of a Network Entity (NE); and
    generating a report associated with the NE, the report being signed by the TNE, the report comprising an identity of the NE, a signature, and trust evaluation information (TEI) associated with the NE, the signature comprising a timestamp.

11. The method according to claim 10, wherein the report associated with the NE comprises a set of trust evaluation information associated with the NE that helps to establish the trust relationship between the NE and another NE, or wherein the report associated with the NE comprises a set of trust evaluation information associated with the NE that helps another NE to evaluate whether it is trustworthy to continue communication with the NE.

12. The method according to claim 10, wherein the TEI associated with the NE comprises at least one of:
    secure boot information of the NE,
    measured boot information of the NE,
    remote attestation information of the NE,
    Highest Common Vulnerabilities and Exposer (CVE) score of the NE,
    a trust index of the NE, and
    a risk index of the NE.

13. The method according to claim 10, further comprising providing the report associated with the NE to the NE or to another NE.

* * * * *